United States Patent
Kojo et al.

(10) Patent No.: US 9,434,408 B2
(45) Date of Patent: Sep. 6, 2016

(54) VEHICLE CONTROL DEVICE

(71) Applicants: Takahiro Kojo, Gotenba (JP); Toru Takashima, Susono (JP)

(72) Inventors: Takahiro Kojo, Gotenba (JP); Toru Takashima, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/650,363

(22) PCT Filed: Jan. 10, 2013

(86) PCT No.: PCT/JP2013/050330
§ 371 (c)(1),
(2) Date: Jun. 8, 2015

(87) PCT Pub. No.: WO2014/109037
PCT Pub. Date: Jul. 17, 2014

(65) Prior Publication Data
US 2015/0314803 A1    Nov. 5, 2015

(51) Int. Cl.
*B62D 5/04*    (2006.01)
*B60T 8/1755*    (2006.01)
*B60W 30/18*    (2012.01)
*B60T 8/88*    (2006.01)

(52) U.S. Cl.
CPC ........... *B62D 5/0484* (2013.01); *B60T 8/1755* (2013.01); *B60T 8/885* (2013.01); *B60W 30/18* (2013.01); *B62D 5/049* (2013.01); *B60T 2270/402* (2013.01)

(58) Field of Classification Search
CPC ... B62D 5/0484; B62D 5/049; B60T 8/1755; B60T 8/885; B60T 2270/402; B60W 30/18
USPC ............................................................ 701/43
See application file for complete search history.

(56) References Cited

U.S. PATENT DOCUMENTS

| | | | |
|---|---|---|---|
| 5,283,740 A | 2/1994 | Sato et al. | |
| 8,754,764 B2 * | 6/2014 | Bechtler | B60T 8/885 303/122.03 |
| 8,935,037 B2 * | 1/2015 | Bechtler | G01D 3/08 701/29.1 |

FOREIGN PATENT DOCUMENTS

| | | |
|---|---|---|
| JP | 04-349075 A | 12/1992 |
| JP | 2007-223456 A | 9/2007 |
| JP | 2010-179679 A | 8/2010 |

OTHER PUBLICATIONS

International Search Report for PCT/JP2013/050330 dated Mar. 5, 2013.

\* cited by examiner

*Primary Examiner* — Richard Camby
(74) *Attorney, Agent, or Firm* — Sughrue Mion, PLLC (57) ABSTRACT

A vehicle control device includes: an angle sensor configured to detect a rotation angle of a steering system of a vehicle; an actuator mounted on the vehicle; and a control device configured to perform a vehicle control by controlling the actuator based on the detection result of the angle sensor. At a time the angle sensor has failed, the control device is configured to limit the vehicle control at a time an estimation angle error obtained based on a failure time of the angle sensor and the rotation speed of the steering system is not smaller than a predetermined reference value and not to limit the vehicle control at a time the estimation angle error is smaller than the reference value.

12 Claims, 5 Drawing Sheets

FIG.6

VEHICLE CONTROL DEVICE

CROSS REFERENCE TO RELATED APPLICATIONS

This application is a National Stage of International Application No. PCT/JP2013/050330 filed Jan. 10, 2013, the contents of all of which are incorporated herein by reference in their entirety.

FIELD

The present invention relates to a vehicle control device.

BACKGROUND

As a vehicle control device which is mounted on a vehicle and performs various kinds of vehicle control, for example, Patent Literature 1 discloses a vehicle motion control apparatus including a plurality of devices controlling the motion of a vehicle in response to a detection value of a common sensor that detects one of vehicle motions so as to control the motion of the vehicle. In the vehicle motion control apparatus, when the plurality of devices respectively diagnose the failure of the common sensor and then one of the plurality of devices detects the failure of the common sensor, the control gains of the devices which do not detect the failure of the common sensor among the plurality of devices are decreased to a value larger than zero and smaller than a normal value.

CITATION LIST

Patent Literature

Patent Literature 1: Japanese Patent Application Laid-open No. 2010-179679

SUMMARY

Technical Problem

Incidentally, the vehicle motion control apparatus disclosed in Patent Literature 1 described above has a room for improvement, for example, in the continuation of the vehicle control.

The invention is made in view of the above-described circumstances, and an object thereof is to provide a vehicle control device capable of appropriately continuing a vehicle control.

Solution to Problem

To achieve the object, a vehicle control device according to the present invention includes: an angle sensor configured to detect a rotation angle of a steering system of a vehicle; an actuator mounted on the vehicle; and a control device configured to perform a vehicle control by controlling the actuator based on the detection result of the angle sensor, and at a time the angle sensor has failed, the control device is configured to limit the vehicle control at a time an estimation angle error obtained based on a failure time of the angle sensor and the rotation speed of the steering system is not smaller than a predetermined reference value and not to limit the vehicle control at a time the estimation angle error is smaller than the reference value.

Moreover, in the vehicle control device, the rotation speed of the steering system is set in response to a predetermined assumed maximum rotation speed.

Moreover, in the vehicle control device, the control device is configured to perform other control different from the vehicle control based on the detection result of the angle sensor, limit the other control at the time the angle sensor has failed, and not to limit the vehicle control at a time the estimation angle error is smaller than the reference value.

Moreover, in the vehicle control device, the estimation angle error relatively becomes larger as the failure time of the angle sensor relatively becomes longer, and relatively becomes larger as the rotation speed of the steering system relatively becomes faster.

Moreover, the vehicle control device includes a stop mechanism configured to regulate a change in the rotation angle of the steering system, and the control device is configured to calculate the estimation angle error based on the failure time of the angle sensor and the rotation speed of the steering system, and suppress an increase in the calculated estimation angle error while the stop mechanism regulates a change in the rotation angle of the steering system after the angle sensor has failed.

Moreover, the vehicle control device includes a rotary machine configured to brake a rotation of a part of which the rotation angle is detected by the angle sensor at the time the angle sensor has failed.

Moreover, in the vehicle control device, the control device is configured to calculate the estimation angle error based on a counter-electromotive force generated in the rotary machine at a time the rotation of the part of which the rotation angle is detected by the angle sensor is braked.

Moreover, in the vehicle control device, the control device is configured to correct the output value of the angle sensor based on the counter-electromotive force generated in the rotary machine at a time the rotation of the part of which the rotation angle is detected by the angle sensor is braked.

Moreover, in the vehicle control device, the control device is configured to determine whether to correct the output value of the angle sensor based on a parameter involved with a motion actually generated in the vehicle and a parameter involved with a motion of the vehicle estimated based on the corrected output value of the angle sensor.

Moreover, in the vehicle control device, the angle sensor includes at least one of: a steering angle sensor configured to detect a rotation angle of a steering member of the vehicle as the rotation angle of the steering system; a VGRS angle sensor configured to detect a VGRS angle of a VGRS device changing a steering angle of a steering wheel with respect to the steering angle of the steering member as the rotation angle of the steering system; and a rear wheel steering angle sensor configured to detect a rear wheel steering angle of a rear wheel steering device capable of steering a rear wheel of the vehicle as the rotation angle of the steering system.

Moreover, in the vehicle control device, the vehicle control is a VSC control of controlling the turning state of the vehicle.

Moreover, in the vehicle control device, the control device is configured to limit the vehicle control by prohibiting the vehicle control or limiting a target control amount of the vehicle control to a relatively small value compared to the case where the vehicle control is not limited.

Advantageous Effects of Invention

The vehicle control device according to the invention has an effect that the vehicle control may be appropriately continued.

DESCRIPTION OF EMBODIMENTS

Hereinafter, embodiments according to the invention will be described in detail with reference to the drawings. In addition, the invention is not limited to the embodiments. Further, the components in the embodiments below include a component which may be easily replaced by the person skilled in the art or a component which has substantially the same configuration.

[First Embodiment]

Figure 1:
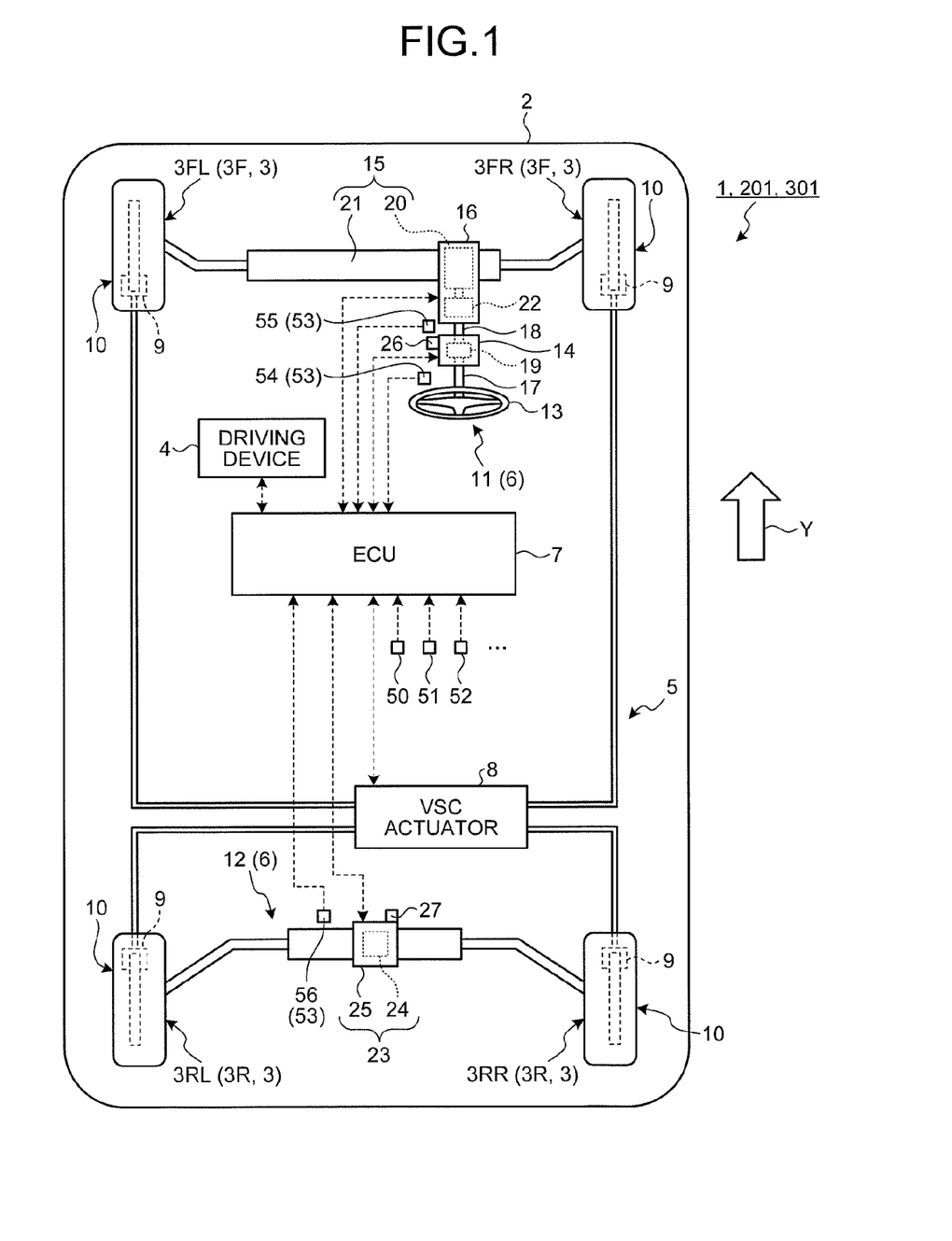
FIG. 1 is a schematic configuration diagram illustrating a vehicle equipped with a vehicle control device according to a first embodiment.
Figure 2:
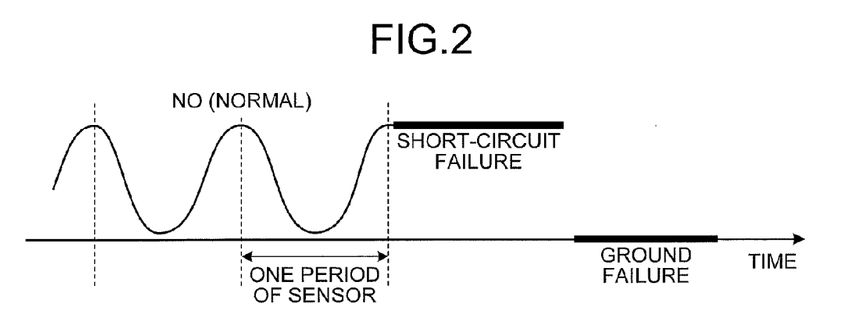
FIG. 2 is a line map illustrating a determination on a sensor failure in the vehicle control device according to the first embodiment.
Figure 3:
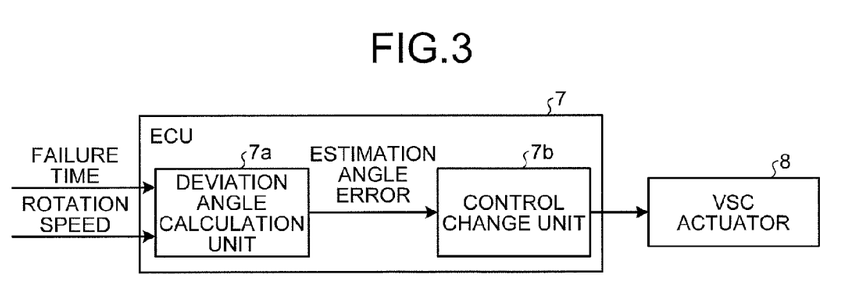
FIG. 3 is a block diagram illustrating an example of a schematic configuration of an ECU according to the first embodiment.
Figure 4:
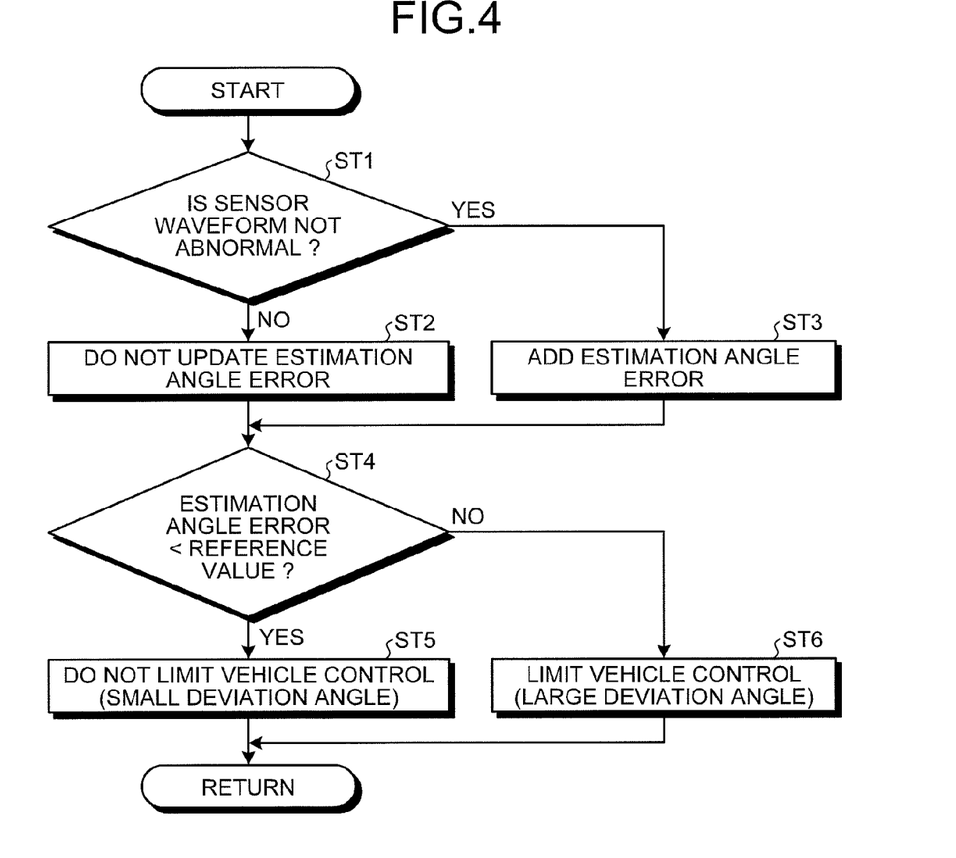
FIG. 4 is a flowchart illustrating an example of a control that is performed by the ECU according to the first embodiment.

FIG. 1 is a schematic configuration diagram illustrating a vehicle equipped with a vehicle control device according to a first embodiment. FIG. 2 is a line map illustrating a determination on a sensor failure in the vehicle control device according to the first embodiment. FIG. 3 is a block diagram illustrating an example of a schematic configuration of an ECU according to the first embodiment. FIG. 4 is a flowchart illustrating an example of a control that is performed by the ECU according to the first embodiment.

As illustrated in FIG. 1, a vehicle control device 1 of the embodiment is mounted on a vehicle 2. The vehicle control device 1 is applied to a control system that typically uses an operation angle of a VGRS (Variable Gear Ratio Steering) system or an ARS (Active Rear Steering) system as an input angle sensor in the steering system of the vehicle 2 including a steering device 6. Then, for example, when a failure of a sensor occurs, the vehicle control device 1 estimates an estimation angle error (a displacement amount) based on a steering speed, an instantaneous interruption time, or the like and changes a predetermined control (for example, a VSC (Vehicle Stability Control) control or a path control) in response to the estimation angle error. Here, the vehicle control device 1 reduces the control stop frequency by preventing the discontinuous control, for example, in a manner such that a predetermined control is interrupted when the estimation angle error is relatively large and a predetermined control is continued when the estimation angle error is relatively small.

Hereinafter, the configurations of the vehicle control device 1 will be described in detail with reference to FIG. 1.

Here, the vehicle 2 moves forward in the direction indicated by the arrow Y of FIG. 1. The direction in which the vehicle 2 moves forward indicates the direction which is directed from a driver seat for a driver of the vehicle 2 toward a steering wheel 13. The left and right sides are distinguished from each other based on the direction in which the vehicle 2 moves forward (the direction indicated by the arrow Y of FIG. 1). That is, the "left side" indicates the left side in the direction in which the vehicle 2 moves forward, and the "right side" indicates the right side in the direction in which the vehicle 2 moves forward. Further, as for the front and rear sides of the vehicle 2, the direction in which the vehicle 2 moves forward is set as the front side, and the direction in which the vehicle 2 moves backward, that is, the direction opposite to the direction in which the vehicle 2 moves forward is set as the rear side.

The vehicle 2 includes a left front wheel (a left front side vehicle wheel 3) 3FL, a right front wheel (a right front side vehicle wheel 3) 3FR, a left rear wheel (a left rear side vehicle wheel 3) 3RL, and a right rear wheel (a right rear side vehicle wheel 3) 3RR as vehicle wheels 3. Further, in the description below, the left front wheel 3FL, the right front wheel 3FR, the left rear wheel 3RL, and the right rear wheel 3RR will be simply referred to as the "vehicle wheel 3" unless otherwise specified. Further, in the description below, the left front wheel 3FL and the right front wheel 3FR will be simply referred to as the "front wheel 3F" unless otherwise specified. Similarly, in the description below, the left rear wheel 3RL and the right rear wheel 3RR will be simply referred to as the "rear wheel 3R" unless otherwise specified.

Specifically, as illustrated in FIG. 1, the vehicle control device 1 is mounted on the vehicle 2, and includes a driving device 4, a braking device 5, the steering device 6, and an ECU (Electronic Control Unit) 7 as a control device.

The driving device 4 forms a power train including a power source, a transmission, and the like in the vehicle 2, and rotationally drives the vehicle wheel 3 as the drive wheel. The power source of the driving device 4 generates rotation power used for the vehicle 2 to travel, and corresponds to a travel power source of an internal-combustion engine (an engine) or an electric motor (a rotary machine). The driving device 4 is electrically connected to the ECU 7, and is controlled by the ECU 7. In the vehicle 2, the driving device 4 generates power (torque) in response to the operation (the accelerator operation) of the accelerator pedal from the driver, and the power is transmitted to the vehicle wheel 3 so that a driving force is generated in the vehicle wheel 3.

The braking device 5 generates a brake force in the vehicle wheel 3 of the vehicle 2. The vehicle 2 generates a braking force in the vehicle wheel 3 when a braking device 5 is operated in response to the operation (the brake operation) of the brake pedal from the driver. The braking device 5 may be configured as various hydraulic braking devices in which brake oil as a working fluid is charged in a hydraulic line connected from a master cylinder to a wheel cylinder 9 via a VSC actuator 8. In the braking device 5, a braking unit 10 is provided in each vehicle wheel 3. Each braking unit 10 applies a braking force to each vehicle wheel 3 of the vehicle 2 through a friction. Each braking unit 10 is operated in response to a wheel cylinder pressure generated by brake oil supplied to the wheel cylinder 9 so as to generate a pressure braking force in the vehicle wheel 3. When the driver basically operates the brake pedal of the braking device 5, a master cylinder pressure (an operation pressure) is applied to the brake oil by the master cylinder in response to a pedal stepping force (an operation force) applied to the brake pedal. Then, in the braking device 5, a pressure generated in response to the master cylinder pressure or a pressure adjusted by the VSC actuator 8 acts as a wheel cylinder pressure in each wheel cylinder 9. In each braking unit 10, when a brake pad supported by a caliper is pressed against a disk rotor in a contact state by the wheel cylinder pressure, the contact surface between the brake pad and the disk rotor becomes a friction surface. Then, each braking unit 10 may apply a braking force to the vehicle wheel 3 through a friction in a manner such that a predetermined rotation resistance force generated in response to the wheel cylinder pressure acts on the disk rotor rotating along with the vehicle wheel 3 by the friction force generated in the friction surface. In the meantime, the braking device 5 appropriately adjusts the wheel cylinder pressure by the VSC actuator 8 in response to the driving state.

Here, the VSC actuator 8 individually adjusts the braking force generated in each vehicle wheel 3 by individually increasing, decreasing, and maintaining the wheel cylinder pressure in each of four wheels. The VSC actuator 8 is provided in a hydraulic line which connects the master cylinder to the wheel cylinder 9, and controls the braking force applied to each vehicle wheel 3 by increasing or decreasing the liquid pressure inside each wheel cylinder 9 under the control of the ECU 7 in addition to the brake operation of the brake pedal. The VSC actuator 8 includes, for example, a plurality of pipes, an oil resolver, an oil pump, a hydraulic pipe connected to each wheel cylinder 9 provided in each vehicle wheel 3, a plurality of electromagnetic valves for increasing, decreasing, or maintaining the hydraulic pressure of each hydraulic pipe, and the like and is controlled by the ECU 7. The VSC actuator 8 serves as a hydraulic fluid pressure adjustment unit which transmits the hydraulic pressure (the master cylinder pressure) inside the hydraulic pipe to each wheel cylinder 9 in accordance with the control instruction of the ECU 7 while the hydraulic pressure is not changed or is increased, or decreased.

In a normal operation state, the VSC actuator 8 may adjust the wheel cylinder pressure acting on the wheel cylinder 9 in response to the operation amount (the stepping amount) of the brake pedal from the driver, for example, in a manner such that an oil pump or a predetermined electromagnetic valve is driven in accordance with the control instruction of the ECU 7. Further, as will be described below, the VSC actuator 8 may be operated to perform a pressure increasing mode of increasing the wheel cylinder pressure acting on the wheel cylinder 9, a pressure maintaining mode of maintaining the wheel cylinder pressure substantially at the constant value, and a pressure decreasing mode of decreasing the wheel cylinder pressure, for example, in a manner such that an oil pump or a predetermined electromagnetic valve is driven in accordance with the control instruction of the ECU 7 when a control of stabilizing the motion of the vehicle 2 is performed. The VSC actuator 8 may individually set the above-described mode for each wheel cylinder 9 of each vehicle wheel 3 in response to the travel state of the vehicle 2 by the control of the ECU 7. That is, the VSC actuator 8 may individually adjust the braking force acting on each vehicle wheel 3 in response to the travel state of the vehicle 2 regardless of the operation of the brake pedal from the driver. Accordingly, the braking device 5 may individually apply the braking force to each vehicle wheel 3.

The steering device 6 constitutes the steering system of the vehicle 2, and is used herein to steer the front wheel 3F and the rear wheel 3R. The steering device 6 of the embodiment includes a front wheel steering device 11 and a rear wheel steering device 12. The front wheel steering device 11 may steer the front wheel 3F of the vehicle 2, and hence steers the left front wheel 3FL and the right front wheel 3FR as the steering wheels. The rear wheel steering device 12 may steer the rear wheel 3R of the vehicle 2, and hence steers the left rear wheel 3RL and the right rear wheel 3RR as the steering wheels.

Typically, the front wheel steering device 11 includes the steering wheel (hereinafter, simply referred to as the "steering") 13 which serves as a steering member as a steering operation member operated by the driver, a VGRS device 14, a steering angle giving mechanism 15, an EPS (Electronic Power Steering) device 16, and the like.

The steering 13 is connected to each of the left front wheel 3FL and the right front wheel 3FR through an upper steering shaft 17, the VGRS device 14, a lower steering shaft 18, and the steering angle giving mechanism 15. The upper steering shaft 17 is a rotation shaft which is connected to the steering 13, and rotates along with the steering 13.

The VGRS device 14 is a VGRS actuator which controls the steering angles of the steering wheels (the left front wheel 3FL and the right front wheel 3FR) with respect to the steering angle (the steering angle) of the steering 13 in a variable manner. The VGRS device 14 may continuously changes the ratio between the rotation amount of the upper steering shaft 17 and the rotation amount of the lower steering shaft 18. The VGRS device 14 of the embodiment includes a VGRS motor 19 including a fixed member connected to the upper steering shaft 17 and a rotor connected to the lower steering shaft 18. The VGRS device 14 controls the relative rotation amount between the upper steering shaft 17 and the lower steering shaft 18 in a variable manner by the VGRS motor 19.

As the steering angle giving mechanism 15, a rack and pinion mechanism which steers the front wheel 3F while being driven by the steering operation of the steering 13 may be used, but the invention is not limited thereto. Here, the steering angle giving mechanism 15 includes a pinion gear 20 and a rack bar 21. The pinion gear 20 is connected to the end of the lower steering shaft 18, and rotates in synchronization with the rotation of the lower steering shaft 18. The rack bar 21 includes a gear tooth meshing with the gear tooth of the pinion gear 20. The rotation of the pinion gear 20 is converted into the movement of the rack bar 21 in the vehicle width direction (the right and left direction of FIG. 1). The movement of the rack bar 21 in the vehicle width direction is transmitted to the left front wheel 3FL and the right front wheel 3FR through a support bar or a knuckle, and hence the left front wheel 3FL and the right front wheel 3FR are steered.

The EPS device 16 is a so-called electric power steering device (an EPS actuator) which assists the steering force applied from the driver to the steering 13 by the power (the steering assisting force) of the electric motor or the like. More specifically, the EPS device 16 is a steering torque output device which generates an output torque such as an assist torque or a damping torque and applies the generated output torque to the lower steering shaft 18. The EPS device 16 includes an EPS motor 22 which is connected to the lower steering shaft 18, and generates an output torque by the EPS motor 22. The rotation of the EPS motor 22 is transmitted to the lower steering shaft 18 while the rotation speed thereof is decreased by a worm gear (not illustrated).

The rear wheel steering device 12 may steer the rear wheel 3R of the vehicle 2. The rear wheel steering device 12 includes a rear wheel ARS device 23 which steers the rear wheel 3R while being driven by the power of the electric motor or the like. The ARS device 23 includes, for example, an ARS motor 24 which generates power for steering the rear wheel 3R, a steering force transmission mechanism 25 which includes a worm gear transmitting the power generated by the ARS motor 24 while the power is converted into a steering force, and the like. The rear wheel steering device 12 may change the operation angle (hereinafter, also referred to as the "rear wheel steering angle") of the rear wheel 3R with respect to the steering angle, for example, in response to the driving state (for example, the vehicle speed) of the vehicle 2 by the ARS device 23.

The ECU 7 is used to control the drive states of the units of the vehicle 2, and includes an electronic circuit mainly including an existing microcomputer with a CPU, a ROM, a RAM and an interface. The ECU 7 is electrically connected to, for example, various sensors and detectors, and hence electric signals corresponding to the detection result are input thereto. Further, the ECU 7 is electrically connected to the units of the vehicle 2 like the driving device 4, the VSC actuator 8 of the braking device 5, the VGRS device 14 of the steering device 6, the EPS device 16, the ARS device 23, and the like. The ECU 7 controls the driving of the units that output drive signals to the units of the vehicle 2 by performing a control program stored therein based on various maps or various input signals input from various sensors and detectors.

The vehicle control device 1 of the embodiment includes, for example, a vehicle wheel speed sensor 50, a yaw rate sensor 51, a lateral G sensor 52, an angle sensor 53, and the like as various sensors and detectors. The vehicle wheel speed sensor 50 is provided in each vehicle wheel 3, and detects the vehicle wheel speed as the rotation speed of the vehicle wheel 3. The ECU 7 may calculate the vehicle speed as the travel speed of the vehicle 2, for example, based on the vehicle wheel speed of each vehicle wheel 3 detected by each vehicle wheel speed sensor 50. The yaw rate sensor 51 detects the yaw rate of the vehicle 2. The lateral G sensor 52 detects a lateral acceleration acting on the vehicle body of the vehicle 2. The angle sensor 53 detects the rotation angle of the steering system of the vehicle 2. The angle sensor 53 includes, for example, a steering angle sensor 54, a VGRS angle sensor 55, a rear wheel steering angle sensor 56, and the like. The steering angle sensor 54 detects the steering angle (hereinafter, also referred to as the "steering angle") which is the rotation angle of the steering 13 corresponding to the steering member as the rotation angle of the steering system of the vehicle 2. The VGRS angle sensor 55 detects the VGRS angle of the VGRS device 14 as the rotation angle of the steering system of the vehicle 2. Here, the VGRS angle sensor 55 detects, for example, the VGRS relative rotation angle as the rotation phase difference between the upper steering shaft 17 and the lower steering shaft 18 of the VGRS device 14. The rear wheel steering angle sensor 56 detects the rear wheel steering angle of the rear wheel steering device 12 as the rotation angle of the steering system of the vehicle 2. In addition, the EPS device 16 includes a sensor that detects the rotation position (the rotation angle) of the EPS motor 22, and may output the detected rotation position of the EPS motor 22 to the ECU 7. Similarly, the ARS device 23 includes a sensor that detects the rotation position (the rotation angle) of the ARS motor 24, and may output the detected rotation position of the ARS motor 24 to the ECU 7.

The ECU 7 determines a control instruction value for the VGRS device 14, the EPS device 16, and the ARS device 23 based on, for example, the rotation angle (the steering angle, the VGRS angle, and the rear wheel steering angle) of the steering system and the vehicle speed. Then, the ECU 7 outputs a control instruction to the VGRS device 14, the EPS device 16, and the ARS device 23, and controls these devices.

Further, the ECU 7 may perform various vehicle controls by controlling the actuator mounted on the vehicle 2 based on the detection result of the angle sensor 53 (the steering angle sensor 54, the VGRS angle sensor 55, the rear wheel steering angle sensor 56, and the like). The ECU 7 of the embodiment may perform a VSC control of controlling the turning state of the vehicle 2 as the vehicle control by controlling the VSC actuator 8 as the actuator.

The ECU 7 of the embodiment may realize a VSC control function by controlling the VSC actuator 8 based on the detection result of the angle sensor 53 so that the wheel cylinder pressure of the wheel cylinder 9 provided in each vehicle wheel 3 is individually increased or decreased and the braking force of each vehicle wheel 3 is individually controlled. Accordingly, the vehicle control device 1 may perform a control of stabilizing the motion of the vehicle 2.

Here, the VSC control is typically a vehicle stabilization control that prevents the skidding of the vehicle body by controlling the braking force or the driving force of the control target wheel so that a yaw moment is generated in the vehicle body in the under-steering direction or the over-steering direction. In the VSC control, the ECU 7 calculates the target yaw rate based on the detection result of the vehicle wheel speed sensor 50, the yaw rate sensor 51, the lateral G sensor 52, the angle sensor 53 (the steering angle sensor 54, the VGRS angle sensor 55, and the rear wheel steering angle sensor 56), and the like, and controls the moment by controlling the braking force of each vehicle wheel 3 based on the difference between the target yaw rate and the actual yaw rate.

For example, as the VSC control, the ECU 7 determines the motion of the vehicle 2 in the turning state based on the operation angle (hereinafter, also referred to as the "front wheel steering angle") of the front wheel 3F calculated based on the steering angle or the VGRS angle, the rear wheel steering angle, the vehicle wheel speed of each vehicle wheel 3, the vehicle speed, the yaw rate, the lateral acceleration, and the like. Then, when the ECU 7 detects an excessive yaw moment generated in the vehicle body as the determination result, the target control amount is determined so that the excessive yaw moment is suppressed and the stable turning operation is performed. At that time, the ECU 7 controls the VSC actuator 8 so that the braking force increases, for example, in a manner such that a required braking force for generating the yaw moment in a direction opposite to the direction of the excessive yaw moment in the vehicle body of the vehicle 2 is applied to the turning outer wheel, for example, the turning front outer wheel (the left front wheel 3FL or the right front wheel 3FR), that is, the wheel cylinder pressure is individually increased. For example, the ECU 7 performs an over-steering suppression control (a so-called spin control) on the turning vehicle 2 by generating a yaw moment in a direction opposite to the direction of the yaw moment acting on the vehicle body with the turning operation by the pressure increasing/braking control for the turning outer wheel in the VSC control so that the vehicle body having an over-steering tendency enters a neutral steering state.

In addition, the control device of the vehicle control device 1 of the embodiment has been described as the control device that also serves as the ECU 7, but the invention is not limited thereto. The control device of the vehicle control device 1 may be separated from the ECU 7, and hence may send and receive information such a detection signal, a driving signal, and a control instruction to and from the ECU 7. Further, the ECU 7 may have a configuration in which a travel control ECU controlling the entire travel state of the vehicle 2, a drive control ECU controlling the driving device 4 of the vehicle 2, a brake control ECU controlling the braking device 5 of the vehicle 2, a steering control ECU controlling the steering device 6 of the vehicle 2, and the like are separated from one another and information such as a detection signal, a driving signal, and a control instruction is sent and received thereamong. More specifically, the ECU 7 may have a configuration in which a VGRSECU controlling the VGRS device 14, an EPSECU controlling the EPS device 16, an ARSECU controlling the ARS device 23, and the like are separated from one another and information such as a detection signal, a driving signal, and a control instruction is sent and received thereamong.

Further, the ECU 7 (VGRSECU), the steering 13, the VGRS device 14, the steering angle giving mechanism 15, the steering angle sensor 54, the VGRS angle sensor 55, and the like described above constitute a so-called VGRS system (a variable rudder angle control device). Further, the ECU 7 (ARSECU), the steering 13, the ARS device 23, the rear wheel steering angle sensor 56, and the like described above constitute a so-called ARS system (an ARS control device). Further, the ECU 7 (the brake control ECU), the VSC actuator 8, the vehicle wheel speed sensor 50, the yaw rate sensor 51, the steering angle sensor 54, the VGRS angle sensor 55, the rear wheel steering angle sensor 56, and the like described above constitute a so-called VSC system (a VSC control device).

Incidentally, the above-described vehicle control device 1 instantly stops the functions of the VGRS system, the ARS system, and the like, for example, when the angle sensor 53 like the steering angle sensor 54, the VGRS angle sensor 55, the rear wheel steering angle sensor 56, and the like is instantaneously interrupted, but the function of the VSC system may be maintained as it is.

For example, when a deviation in the rotation angle of the steering system detected by the angle sensor 53 occurs due to the sensor failure (abnormality), an angle error corresponding to the angle difference occurs in the target control amount in the VSC control, and hence there is a concern that the target VSC characteristic may not be obtained due to the early operation or the late operation. For this reason, the VSC control may be stopped in such a case. In this case, when the sensor failure is sensitively determined, there is a case in which the VSC control may be stopped even when the VSC control may exhibit a sufficient effect in actuality. For this reason, the sensor abnormality determination may be performed for a sufficient time. However, in this case, there is a problem in which a large deviation may occur in the control target amount when the angle error increases. Thus, there is a concern that the unexpected VSC control may be performed. For this reason, the ECU 7 promptly determines a sensor failure (a short-circuit failure, a ground failure, or the like) for a comparatively short sensor abnormality determination time by using, for example, a sensor signal changing in real time as illustrated in the example of FIG. 2. In addition, there is a tendency that the abnormality of the steering angle sensor 54 of the angle sensor 53 needs to be determined in the shorter time so that the abnormality is appropriately handled even at the maximum rotation speed in that the rotation speed of the steering 13 becomes different in accordance with the driver's steering method.

On the contrary, the ECU 7 of the vehicle control device 1 of the embodiment may appropriately continue the VSC control (the vehicle control) by changing a predetermined vehicle control, that is, the VSC control in response to the angle error estimated based on the rotation speed of the steering system and the failure time of the angle sensor 53 when a failure of the angle sensor 53 occurs.

Specifically, the ECU 7 limits the VSC control when the angle error estimated based on the failure time of the angle sensor 53 and the rotation speed of the steering system is a predetermined reference value or more when a failure of the angle sensor 53 occurs, and does not limit the VSC control and continues the VSC control when the estimation angle error is smaller than the reference value. Here, the ECU 7 may perform the above-described control based on the estimation angle error of the sensor having a failure when one of the steering angle sensor 54, the VGRS angle sensor 55, and the rear wheel steering angle sensor 56 constituting the angle sensor 53 has failed.

Here, the failure time of the angle sensor 53 typically corresponds to the time in which the sensor has failed by the sensor abnormality determination. The ECU 7 may measure the failure time based on the sensor signal of the failed sensor, for example, when the failure of any sensor of the angle sensor 53 is determined by the sensor abnormality determination.

Further, the rotation speed of the steering system typically corresponds to the rotation angular velocity (the rotation angle derivative value) of the rotation angle detected by the angle sensor 53. The rotation speed of the steering system corresponds to the rotation speed (the steering angle derivative value) of the steering 13 when the steering angle sensor 54 of the angle sensor 53 has failed. The rotation speed of the steering system corresponds to the relative rotation speed (the VGRS angle derivative value) between the upper steering shaft 17 and the lower steering shaft 18 when the VGRS angle sensor 55 of the angle sensor 53 has failed. The rotation speed of the steering system corresponds to the steering speed (the rear wheel steering angle derivative value) of the rear wheel 3R when the rear wheel steering angle sensor 56 of the angle sensor 53 has failed. Then, the ECU 7 may use a rotation speed immediately before the failure of each sensor or a predetermined rotation speed as the rotation speed of the steering system obtained when the angle sensor 53 has failed. The ECU 7 may use, for example, a predetermined assumed maximum rotation speed as a predetermined rotation speed. The assumed maximum rotation speed may be arbitrarily set in advance based on, for example, a real vehicle evaluation for the rotation speed corresponding to each sensor. Here, the ECU 7 sets the rotation speed of the steering system when the angle sensor 53 has failed in response to the predetermined assumed maximum rotation speed. In this case, the ECU 7 may use the assumed maximum rotation speed as the rotation speed of the steering system when the angle sensor 53 has failed, and may gradually increase the rotation speed from the rotation speed obtained immediately before the failure of the sensor to the assumed maximum rotation speed by a predetermined increase amount. Accordingly, the vehicle control device 1 may more safely determine whether to limit or continue the VSC control in that the rotation speed of the steering system is set in response to the assumed maximum rotation speed.

For example, as illustrated in FIG. 3, the ECU 7 of the embodiment includes a deviation angle calculation unit 7a, a control change unit 7b, and the like from the concept of the function.

The deviation angle calculation unit 7a calculates an estimation angle error in the sensor having a failure based on the assumed maximum rotation speed (ACT–MaxSpeed) as the rotation speed of the steering system and the failure time (Δt) of the angle sensor 53 measured and set as described above when the angle sensor 53 has failed. The estimation angle error typically corresponds to the deviation angle amount caused by the sensor failure of the rotation angle of the steering system detected by the angle sensor 53. The estimation angle error relatively becomes larger as the failure time of the angle sensor 53 relatively becomes longer, and relatively becomes larger as the rotation speed of the steering system relatively becomes faster. Typically, as the estimation angle error relatively becomes larger, the deviation angle of the rotation angle detected by the angle sensor 53 having a failure relatively becomes larger, and the reliability relatively becomes lower.

The deviation angle calculation unit 7a calculates, for example, the product [ACT–MaxSpeed×Δt] of the failure time (Δt) and the assumed maximum rotation speed (ACT–MaxSpeed), and calculates the estimation angle error based on the product [ACT–MaxSpeed×Δt] and the estimation angle error map (or the equation model corresponding thereto). The estimation angle error map describes the relation between the product [ACT–MaxSpeed×Δt] and the estimation angle error. The estimation angle error map is stored in advance in the storage unit of the ECU 7 after the relation between the product [ACT–MaxSpeed×Δt] and the estimation angle error is set in advance based on the actual vehicle evaluation or the like. As described above, in the estimation angle error map, the estimation angle error relatively becomes larger as the product [ACT–MaxSpeed×Δt] relatively becomes larger, that is, the failure time of the angle sensor 53 relatively becomes longer. Further, the estimation angle error relatively becomes larger as the rotation speed of the steering system relatively becomes faster. The deviation angle calculation unit 7a receives signals involved with the failure time and the rotation speed, and calculates the estimation angle error from the estimation angle error map based on these signals. The deviation angle calculation unit 7a calculates the estimation angle error of the steering angle sensor 54 when the steering angle sensor 54 of the angle sensor 53 has failed, calculates the estimation angle error of the VGRS angle sensor 55 when the VGRS angle sensor 55 has failed, and calculates the estimation angle error of the rear wheel steering angle sensor 56 when the rear wheel steering angle sensor 56 has failed. The deviation angle calculation unit 7a outputs a signal involved with the calculated estimation angle error to the control change unit 7b.

The control change unit 7b changes the VSC control (the vehicle control) based on the signal involved with the estimation angle error input from the deviation angle calculation unit 7a. The control change unit 7b outputs a control signal based on the signal involved with the estimation angle error to the VSC actuator 8, and controls the VSC actuator 8 so as to change the VSC control.

Specifically, the control change unit 7b limits the VSC control if the estimation angle error obtained based on the failure time of the angle sensor 53 and the rotation speed of the steering system is the reference value or more, that is, the reliability of the rotation angle detected by the angle sensor 53 is relatively low when the angle sensor 53 has failed. Meanwhile, the control change unit 7b does not limit the VSC control if the estimation angle error is smaller than the reference value, that is, the reliability of the rotation angle detected by the angle sensor 53 is relatively high when the angle sensor has failed. Here, the reference value is a threshold value set for the estimation angle error, and may be set within the allowable VSC characteristic based on, for example, the real vehicle evaluation or the like.

When the VSC control is limited, the control change unit 7b may, for example, prohibit the VSC control and may relatively limit the target control amount to a small value. Further, the control change unit 7b may reduce the intervention amount (the influence degree) of the VSC control by, for example, setting a dead zone in response to the estimation angle error. Further, the control change unit 7b may acquire a control reference angle (for example, the rotation angle when the vehicle 2 moves forward) of each rotation angle in the VSC control without performing the current VSC control, and may perform the next VSC control based on the control reference angle. Meanwhile, when the VSC control is not limited, the control change unit 7b continues the normal VSC control by predicting the estimation angle error of each rotation angle detected by the angle sensor 53 immediately before the failure.

In addition, the ECU 7 of the embodiment may perform a VGRS control using the VGRS device 14 and an ARS control using the ARS device 23 as the other control different from the VSC control (the vehicle control) based on the detection result of the angle sensor 53. In the VGRS control and the ARS control, since the detection result of the angle sensor 53 is used in the feed-back control or the like, there is a tendency that the influence degree of the sensor failure is relatively large compared to the VSC control.

Here, the ECU 7 of the embodiment promptly limits the VGRS control and the ARS control as the other controls when the angle sensor 53 has failed, and does not limit the VSC control when the estimation angle error is smaller than the reference value as described above. That is, the vehicle control device 1 promptly stops the VGRS control when the steering angle sensor 54 and the VGRS angle sensor 55 have failed in the VGRS system and the VSC system using the steering angle sensor 54 and the VGRS angle sensor 55 as the angle sensor 53, and continues the VSC control when the estimation angle error obtained in response to the failure time or the like is within a predetermined range. Similarly, the vehicle control device 1 promptly stops the ARS control when the rear wheel steering angle sensor 56 has failed in the ARS system and the VSC system using the rear wheel steering angle sensor 56 as the angle sensor 53, and continues the VSC control when the estimation angle error obtained in response to the failure time or the like is within a predetermined range.

Next, an example of a control that is performed by the ECU 7 will be described with reference to the flowchart of FIG. 4. In addition, these control routines are repeatedly performed at the control period of several milliseconds to several tens milliseconds.

First, the ECU 7 determines whether the sensor waveform (for example, see FIG. 2) is abnormal by monitoring the sensor signal of the angle sensor 53 (the steering angle sensor 54, the VGRS angle sensor 55, the rear wheel steering angle sensor 56, and the like) (step ST1).

When the ECU 7 determines that the sensor waveform is not abnormal (step ST1: NO), that is, the angle sensor 53 does not have a failure, the ECU performs a process in step ST4 without updating the estimation angle error (step ST2). In addition, the initial value of the estimation angle error is 0, and is reset to the initial value, for example, when the sensor failure is solved when the ignition switch of the vehicle 2 is turned off.

When the ECU 7 determines that the sensor waveform is abnormal (step ST1: YES), that is, the angle sensor 53 has a failure, the ECU calculates the estimation angle error based on the failure time of the angle sensor 53 and the rotation speed of the steering system, increases the estimation angle error by adding the current estimation angle error to the estimation angle error of the previous period (step ST3), and performs a process in step ST4. That is, the ECU 7 integrates the estimation angle errors.

In step ST4, the ECU 7 determines whether the current estimation angle error is smaller than a predetermined reference value (step ST4).

When the ECU 7 determines that the current estimation angle error is smaller than a predetermined reference value (step ST4: Yes), the ECU performs the VSC control (the vehicle control) without any limitation (step ST5), ends the current control period, and performs the next control period. In addition, the case where the ECU determines that the current estimation angle error is smaller than a predetermined reference value typically corresponds to the case where the deviation angle amount caused by the sensor failure of the rotation angle detected by the angle sensor 53 is relatively small and the reliability of the detected rotation angle is relatively high.

When the ECU 7 determines that the current estimation angle error is a predetermined reference value or more (step ST4: No), the ECU limits the VSC control (the vehicle control) (step ST6), ends the current control period, and performs the next control period. In addition, the case where the ECU determines that the current estimation angle error is a predetermined reference value or more typically corresponds to the case where the deviation angle amount caused by the sensor failure of the rotation angle detected by the angle sensor 53 is relatively high and the reliability of the detected rotation angle is relatively low.

When the angle sensor 53 has failed, the vehicle control device 1 with the above-described configuration may limit the VSC control if the estimation angle error obtained based on the failure time is not within a predetermined range, and may continue the VSC control (the vehicle control) as much as possible if the estimation angle error is within a predetermined range even when the angle sensor 53 has failed. Thus, the vehicle control device 1 has a configuration in which the angle sensor 53 is commonly used in the other controls like the VGRS control and the ARS control. Accordingly, even when the VGRS control or the ARS control is stopped when the angle sensor 53 has failed, the VSC control (the vehicle control) may be appropriately continued within a predetermined range, and hence the VSC control stop frequency may be reduced. As a result, since the vehicle control device 1 may continue the vehicle control of stabilizing the motion of the vehicle 2 in a predetermined range even when the angle sensor 53 has failed, it is possible to improve the stability of the motion of the vehicle 2.

Here, the vehicle control device 1 of the embodiment has a configuration in which stop mechanisms 26 and 27 (see FIG. 1) are respectively provided in the VGRS device 14 and the ARS device 23. The stop mechanisms 26 and 27 are mechanisms capable of regulating a change in the rotation angle of the steering system. The stop mechanism 26 constitutes a part of the VGRS device 14. The stop mechanism 26 includes, for example, a lock mechanism, a speed reduction mechanism, and the like. When the VGRS angle sensor 55 has failed, the stop mechanism is operated so as to mechanically regulate the relative rotation between the upper steering shaft 17 and the lower steering shaft 18, and the operation of the VGRS device 14 is stopped, so that the VGRS function is stopped. The stop mechanism 27 constitutes a part of the ARS device 23. The stop mechanism 27 includes, for example, a self-lock mechanism (for example, a trapezoidal screw backward friction mechanism or the like). When the rear wheel steering angle sensor 56 has failed, the stop mechanism is operated so as to mechanically regulate the steering operation of the rear wheel 3R, and the operation of the ARS device 23 is stopped, so that the ARS function is stopped.

Then, since an increase in actual deviation angle due to the sensor failure of the VGRS angle sensor 55 and the rear wheel steering angle sensor 56 substantially disappears while the stop mechanisms 26 and 27 are operated, the ECU 7 of the embodiment may suppress an increase in calculated estimation angle error while the stop mechanisms 26 and 27 regulate a change in the rotation angle of the steering system after the VGRS angle sensor 55 and the rear wheel steering angle sensor 56 have failed. Here, the suppression of an increase in estimation angle error includes a concept where the estimation angle error increase amount is decreased compared to the case where the stop mechanisms 26 and 27 are not operated and a concept where the estimation angle error increase amount is set to zero.

For example, when the VGRS angle sensor 55 has failed, the ECU 7 suppresses an increase in the estimation angle error of the VGRS angle sensor 55 after the VGRS lock response time elapses in which a change in VGRS angle is actually regulated by the operation of the stop mechanism 26. The VGRS lock response time is set, for example, based on the actual vehicle evaluation or the like. Similarly, when the rear wheel steering angle sensor 56 has failed, the ECU 7 suppresses an increase in the estimation angle error of the rear wheel steering angle sensor 56 after the ARS lock response time elapses in which a change in rear wheel steering angle is actually regulated by the operation of the stop mechanism 27. The ARS lock response time is set in advance, for example, based on the actual vehicle evaluation or the like. In addition, in the stop mechanism 27 using the self-lock mechanism, there is a tendency that the steering speed gradually decreases to zero when the steering operation of the rear wheel 3R is regulated. Thus, the ARS lock response time or the estimation angle error increase suppression amount may be set based on the tendency. Further, since the ARS lock response time may also change in response to the initial speed when the steering operation of the rear wheel 3R is regulated by the stop mechanism 27, the ARS lock response time may be set in response to the initial speed.

In this case, since the vehicle control device 1 may suppress an increase in the estimation angle error calculated by the ECU 7 after the operation of the stop mechanisms 26 and 27, it is possible to improve the estimation angle error calculation precision and to suppress a problem in which the estimation angle error becomes the reference value or more although the actual deviation angle caused by the sensor failure does not increase. Thus, the vehicle control device 1 may continue the VSC control (the vehicle control) with higher precision, and hence the VSC control stop frequency may be further reduced.

According to the vehicle control device 1 of the above-described embodiment, the vehicle control device includes the angle sensor 53 which detects the rotation angle of the steering system of the vehicle 2, the VSC actuator 8 which is mounted on the vehicle 2, and the ECU 7 which performs the VSC control (the vehicle control) by controlling the VSC actuator 8 based on the detection result of the angle sensor 53. When the angle sensor 53 has failed, the ECU 7 limits the VSC control if the estimation angle error obtained based on the failure time of the angle sensor 53 and the rotation speed of the steering system is a predetermined reference value or more, and does not limit the VSC control when the estimation angle error is smaller than the reference value. Thus, even when the angle sensor 53 has failed, the vehicle control device 1 may continue the VSC control when the estimation angle error is within a predetermined range, and hence the VSC control may be appropriately continued.

[Second Embodiment]

Figure 5:
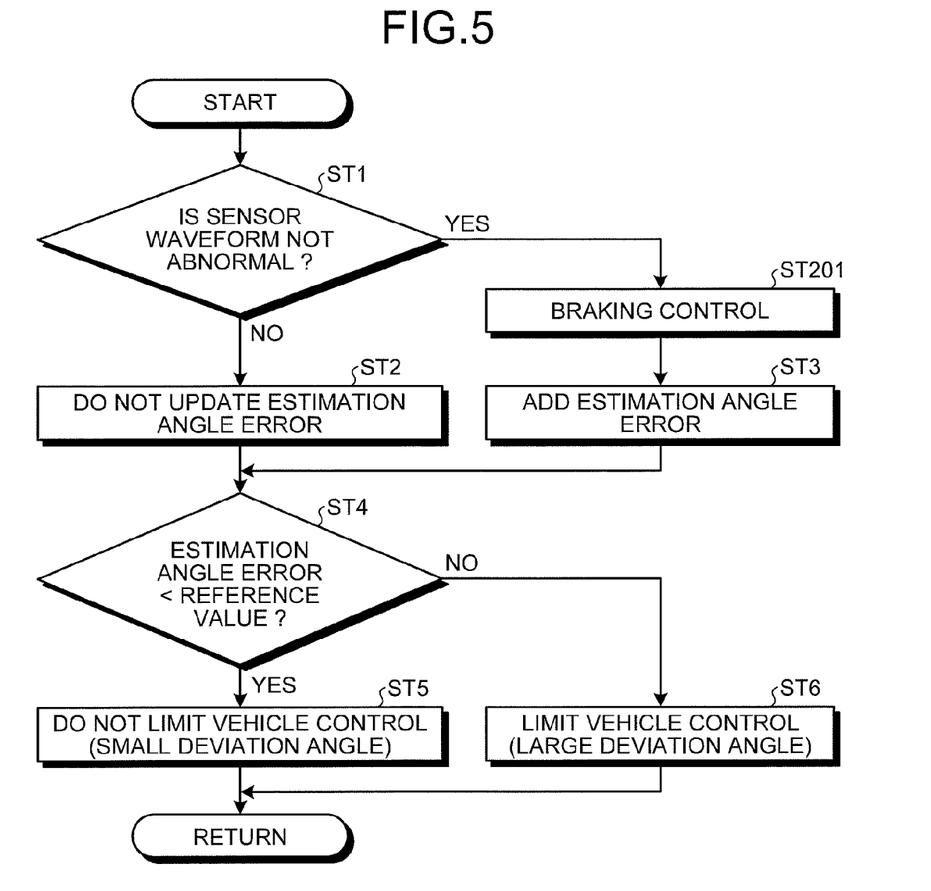
FIG. 5 is a flowchart illustrating an example of a control that is performed by an ECU according to a second embodiment.

FIG. 5 is a flowchart illustrating an example of a control that is performed by an ECU according to a second embodiment. The vehicle control device according to the second embodiment is different from the first embodiment in that the rotation of the steering system is braked by the rotary machine when the angle sensor has failed. In addition, the repetitive description of the configuration, the operation, and the effect which are common to those of the above-described embodiment will not be presented as much as possible. Further, the configurations of the vehicle control device according to the second embodiment will be appropriately described with reference to FIG. 1 and the like (the same applies to the embodiments below).

A vehicle control device 201 (see FIG. 1) according to the embodiment includes a rotary machine which brakes the rotation of the part of which the rotation angle is detected by the angle sensor 53 when the angle sensor 53 has failed. In the vehicle control device 201, the VGRS motor 19 is used as the rotary machine which brakes the rotation of the part of which the rotation angle is detected by the VGRS angle sensor 55, and the ARS motor 24 is used as the rotary machine that detects the rotation of the part of which the rotation angle is detected by the rear wheel steering angle sensor 56.

Here, the VGRS motor 19 and the ARS motor 24 are rotary machines which have various modes such as a free mode, a brake mode, and a phase fixed mode. Accordingly, the VGRS motor 19 and the ARS motor 24 both serve as a motor (an electric motor) and a generator. The VGRS motor 19 and the ARS motor 24 have a power running function of converting electric power supplied from a power storage device such as a battery through an inverter into mechanical power and a regeneration function of converting the input mechanical power into electric power and charging the electric power to the power storage device through an inverter or the like.

Since the VGRS motor 19 serves as a generator when the VGRS angle sensor 55 has failed, it is possible to brake the rotation of the part of which the rotation angle is detected by the VGRS angle sensor 55. Since the ARS motor 24 serves as a generator when the rear wheel steering angle sensor 56 has failed, it is possible to brake the rotation of the part of which the rotation angle is detected by the rear wheel steering angle sensor 56.

Accordingly, in the vehicle control device 201 of the embodiment, since the VGRS motor 19 brakes the rotation of the part of which the rotation angle is detected by the VGRS angle sensor 55 when the VGRS angle sensor 55 has failed, the relative rotation between the upper steering shaft 17 and the lower steering shaft 18 is stopped at the early timing, and the operation of the VGRS device 14 is stopped, so that the VGRS function is stopped. That is, the vehicle control device 201 may relatively shorten the VGRS lock response time, and hence change an increase in actual deviation angle caused by the sensor failure to substantially zero at the early timing. Similarly, in the vehicle control device 201, since the ARS motor 24 brakes the rotation of the part of which the rotation angle is detected by the rear wheel steering angle sensor 56 when the rear wheel steering angle sensor 56 has failed, the steering operation of the rear wheel 3R is stopped at the early timing, and the operation of the ARS device 23 is stopped, so that the ARS function is stopped. That is, the vehicle control device 201 may relatively shorten the ARS lock response time, and hence change an increase in actual deviation angle caused by the sensor failure to substantially zero at the early timing. As a result, the vehicle control device 201 may decrease the actual deviation angle caused by the sensor failure. Further, in this case, since the ECU 7 may set, for example, the assumed maximum rotation speed (ACT-MaxSpeed) or the like to a relatively low value, the estimated estimation angle error like the actual deviation angle may be relatively decreased. As a result, since the vehicle control device 201 may suppress an increase in actual deviation angle caused by the sensor failure and to suppress a problem in which the estimation angle error becomes the reference value or more, the VSC control (the vehicle control) may be continued with higher precision, and hence the VSC control stop frequency may be further reduced.

Further, in this case, the ECU 7 may calculate the estimation angle error based on the counter-electromotive force generated in the rotary machine when the rotation of the part of which the rotation angle is detected by the angle sensor 53 is braked.

For example, when the VGRS angle sensor 55 has failed, the ECU 7 calculates the estimation angle error of the VGRS angle sensor 55 based on the counter-electromotive force generated in the VGRS motor 19 when the VGRS motor 19 brakes the rotation of the part of which the rotation angle is detected by the VGRS angle sensor 55. More specifically, the ECU 7 may calculate the rotation direction and the actual relative rotation speed between the upper steering shaft 17 and the lower steering shaft 18 while the VGRS angle sensor 55 has failed based on the counter-electromotive force generated in the VGRS motor 19. The ECU 7 calculates a relative rotation speed, for example, a rotation speed map representing the relation between the relative rotation speed and the voltage value of the counter-electromotive force and the voltage value of the counter-electromotive force. Typically, the ECU 7 monitors the voltage value of the counter-electromotive force generated in the VGRS motor 19 based on a voltmeter or the like, and calculates the relative rotation speed so that the relative rotation speed relatively becomes higher as the voltage value relatively becomes larger based on the rotation speed map. Then, the ECU 7 may calculate the estimation angle error of the VGRS angle sensor 55 based on the failure time and the relative rotation speed calculated based on the counter-electromotive force generated in the VGRS motor 19. As a result, the ECU 7 may improve the calculation precision for the estimation angle error, may continue the VSC control (the vehicle control) with high precision, and hence further reduce the VSC control stop frequency.

Similarly, when the rear wheel steering angle sensor 56 has failed, the ECU 7 calculates the estimation angle error of the rear wheel steering angle sensor 56 based on the counter-electromotive force generated in the ARS motor 24 when the ARS motor 24 brakes the rotation of the part of which the rotation angle is detected by the rear wheel steering angle sensor 56. More specifically, the ECU 7 may calculate the steering direction and the actual steering speed of the rear wheel 3R while the rear wheel steering angle sensor 56 has failed based on the counter-electromotive force generated in the ARS motor 24. Then, the ECU 7 may calculate the estimation angle error of the rear wheel steering angle sensor 56 based on the failure time and the steering speed calculated based on the counter-electromotive force generated in the ARS motor 24.

Next, an example of a control that is performed by the ECU 7 will be described with reference to the flowchart of FIG. 5. Even here, the repetitive description of FIG. 4 will not be presented as much as possible.

In step ST1, when the ECU 7 determines that the sensor waveform is abnormal (step ST1: No), the ECU performs a braking control of braking the rotation of the part of which the rotation angle is detected by the angle sensor 53 having a failure by the VGRS motor 19 or the ARS motor 24 if the angle sensor 53 having a failure is any one of the VGRS angle sensor 55 and the rear wheel steering angle sensor 56 (ST201), and performs a process in step ST3. In this case, in step ST3, the ECU 7 calculates the estimation angle error based on the counter-electromotive force of the VGRS motor 19 or the ARS motor 24, and increases the estimation angle error by adding the calculated estimation angle error to the previous estimation angle error (step ST3).

The above-described vehicle control device 201 according to the embodiment may appropriately continue the VSC control in that the VSC control may be continued if the estimation angle error is within a predetermined range even when the angle sensor 53 has failed.

Further, according to the vehicle control device 201 of the above-described embodiment, the vehicle control device includes the VGRS motor 19 and the ARS motor 24 which brake the rotation of the part of which the rotation angle is detected by the VGRS angle sensor 55 and the rear wheel steering angle sensor 56 when the angle sensor 53, that is, the VGRS angle sensor 55 and the rear wheel steering angle sensor 56 have failed. Further, according to the vehicle control device 201 of the above-described embodiment, the ECU 7 may calculate the estimation angle error based on the counter-electromotive force generated in the VGRS motor 19 and the ARS motor 24 when the rotation of the part of which the rotation angle is detected by the angle sensor 53, that is, the VGRS angle sensor 55 and the rear wheel steering angle sensor 56 is braked. Thus, the vehicle control device 201 may continue the VSC control (the vehicle control) with higher precision, and hence further reduce the VSC control stop frequency.

[Third Embodiment]

Figure 6:
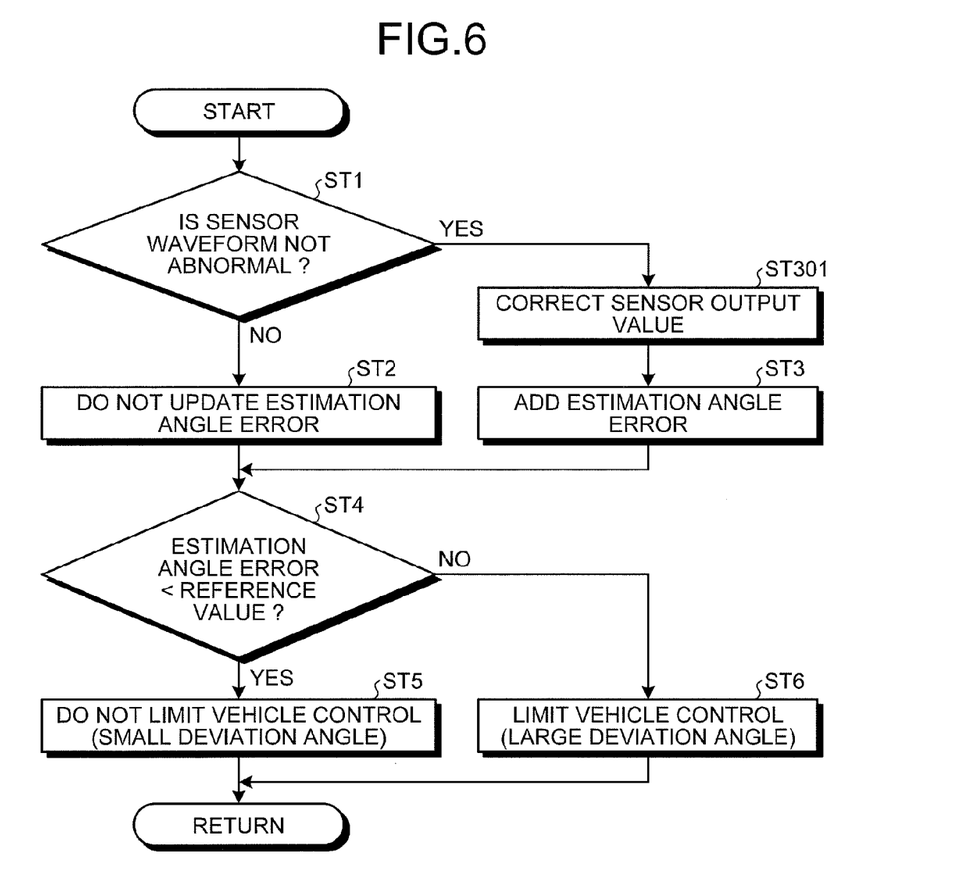
FIG. 6 is a flowchart illustrating an example of a control that is performed by an ECU according to a third embodiment.

FIG. 6 is a flowchart illustrating an example of a control that is performed by an ECU according to a third embodiment. The vehicle control device according to the third embodiment is different from the second embodiment in that the output value of the angle sensor is corrected.

The ECU 7 of a vehicle control device 301 (see FIG. 1) corrects the output value of the angle sensor 53 based on the counter-electromotive force generated in the rotary machine when the rotation of the part of which the rotation angle is detected by the angle sensor 53 is braked.

For example, when the VGRS angle sensor 55 has failed, the ECU 7 corrects the output value of the VGRS angle sensor 55 based on the counter-electromotive force generated in the VGRS motor 19 when the VGRS motor 19 brakes the rotation of the part of which the rotation angle is detected by the VGRS angle sensor 55. More specifically, the ECU 7 calculates the rotation direction and the actual relative rotation speed between the upper steering shaft 17 and the lower steering shaft 18 obtained when the VGRS angle sensor 55 has failed based on the counter-electromotive force generated in the VGRS motor 19. Typically, the ECU 7 monitors the voltage value of the counter-electromotive force generated in the VGRS motor 19 based on the voltmeter or the like, and calculates the relative rotation speed so that the relative rotation speed relatively becomes higher as the voltage value becomes higher based on the rotation speed map. Further, the ECU 7 may further calculate the relative rotation speed and the rotation direction based on the number of a change in phase voltage and current. Then, the ECU 7 calculates the actual deviation angle (in other words, corresponding to the estimation angle error) caused by the sensor failure of the VGRS angle sensor 55 based on the failure time and the relative rotation speed calculated based on the counter-electromotive force generated in the VGRS motor 19. Then, the ECU 7 corrects the output value of the VGRS angle sensor 55 in response to the actual deviation angle caused by the sensor failure, and uses the corrected output value of the VGRS angle sensor 55 as a true value (a correct value) in the next control. That is, the ECU 7 corrects the sensor output value by predicting the actual deviation angle caused by the sensor failure and adding or subtracting the deviation angle. As a result, the vehicle control device 301 may decrease the actual deviation angle caused by the sensor failure. At this time, the ECU 7 may first reset the estimation angle error which has been integrated so far to the initial value and change the VSC control based on the estimation angle error amount calculated in the current control period. As a result, since the vehicle control device 301 may suppress an increase in actual deviation angle caused by the sensor failure and suppress a problem in which the estimation angle error becomes the reference value or more, it is possible to continue the VSC control (the vehicle control) with higher precision, and hence to further reduce the VSC control stop frequency.

Similarly, when the rear wheel steering angle sensor 56 has failed, the ECU 7 corrects the output value of the rear wheel steering angle sensor 56 based on the counter-electromotive force generated in the ARS motor 24 when the ARS motor 24 brakes the rotation of the part of which the rotation angle is detected by the rear wheel steering angle sensor 56. More specifically, the ECU 7 calculates the steering direction and the actual steering speed of the rear wheel 3R while the rear wheel steering angle sensor 56 has failed based on the counter-electromotive force generated in the ARS motor 24. Then, the ECU 7 calculates the actual deviation angle (in other words, corresponding to the estimation angle error) caused by the sensor failure of the rear wheel steering angle sensor 56 based on the failure time and the steering speed calculated based on the counter-electromotive force generated in the ARS motor 24. Then, the ECU 7 corrects the output value of the rear wheel steering angle sensor 56 in response to the actual deviation angle of the sensor failure, and uses the corrected output value of the rear wheel steering angle sensor 56 as a true value (a correct value) in the next control. At this time, the ECU 7 first resets the estimation angle error which has been integrated so far to the initial value, and changes the VSC control based on the estimation angle error amount calculated in the current control period.

In addition, since the sensing precision for the counter-electromotive force generated in the VGRS motor 19 and the ARS motor 24 increases as the rotation speed increases, the ECU 7 may correct the sensor detection value when the counter-electromotive force is higher than a predetermined value, that is, the rotation speed is higher than a predetermined value, and may not correct the sensor detection value when the counter-electromotive force is lower than a predetermined value. Accordingly, the ECU 7 may more appropriately correct the sensor detection value with higher precision, and hence may improve the precision of the control using the sensor detection value.

Next, an example of a control that is performed by the ECU 7 will be described with reference to the flowchart of FIG. 6. Even here, the repetitive description of FIGS. 4 and 5 will not be presented as much as possible.

In step ST1, when the ECU 7 determines that the sensor waveform is abnormal (step ST1: No), the ECU corrects the output value of the sensor having a failure based on the counter-electromotive force of the VGRS motor 19 or the ARS motor 24 when the angle sensor 53 having a failure is any one of the VGRS angle sensor 55 and the rear wheel steering angle sensor 56 (ST301), and performs a process in step ST3. At this time, the ECU 7 first resets the estimation angle error which has been integrated so far to the initial value. Then, in step ST3, the ECU 7 calculates the estimation angle error based on the counter-electromotive force of the VGRS motor 19 or the ARS motor 24, and increases the estimation angle error by adding the estimation angle error to the previous estimation angle error (step ST3). In this case, since the ECU 7 first resets the estimation angle error which has been integrated so far to the initial value, the determination of step ST4 is performed based on the estimation angle error substantially calculated in the current control period.

The vehicle control device 301 according to the above-described embodiment may appropriately continue the VSC control in that the VSC control may be continued if the estimation angle error is within a predetermined range even when the angle sensor 53 has failed.

Further, according to the vehicle control device 301 of the above-described embodiment, the ECU 7 corrects the output values of the VGRS angle sensor 55 and the rear wheel steering angle sensor 56 based on the counter-electromotive force generated in the VGRS motor 19 and the ARS motor 24 when the rotation of the part of which the rotation angle is detected by the angle sensor 53, that is, the VGRS angle sensor 55 and the rear wheel steering angle sensor 56 is braked. Thus, the vehicle control device 301 may suppress an increase in actual deviation angle caused by the sensor failure and continue the VSC control (the vehicle control) with higher precision. Accordingly, the VSC control stop frequency may be further reduced.

In addition, the ECU 7 may determine whether to correct the output value of the angle sensor 53 based on the parameter involved with the motion of the vehicle 2 estimated based on the corrected output value of the angle sensor 53 and the parameter involved with the actual motion of the vehicle 2. As described above, when the ECU 7 corrects the detection value of the VGRS angle sensor 55 or the rear wheel steering angle sensor 56 by predicting the actual deviation angle caused by the sensor failure, the parameter involved with the motion of the vehicle 2 is calculated based on the corrected detection value of the rotation angle. The ECU 7 inversely operates at least one of the yaw rate, the lateral acceleration, the output torque of the EPS device 16, and the like as the parameter involved with the motion of the vehicle 2 from the corrected detection value of the rotation angle by using, for example, the vehicle model for the vehicle 2 stored in the storage unit in advance. Further, the ECU 7 acquires the actual yaw rate, the lateral acceleration, the output torque of the EPS device 16, and the like as the parameter involved with the motion actually generated in the vehicle 2 based on various sensors and the control instruction value.

Then, the ECU 7 determines the matching degree between the parameter (the yaw rate, the lateral acceleration, the output torque of the EPS device 16, and the like) involved with the motion of the vehicle from the corrected detection value of the rotation angle and the actual parameter of the vehicle 2. When the matching degree is larger than a predetermined value, the ECU 7 determines that the output value of the angle sensor 53 is appropriately corrected, and uses the corrected output value of the angle sensor 53 in the next control. When the matching degree is a predetermined value or less, the ECU 7 determines that the output value of the angle sensor 53 is not appropriately corrected, prohibits the corrected output value of the angle sensor 53 from being used in the next control, and returns, for example, the output value of the angle sensor 53 used in the control to the uncorrected output value of the angle sensor 53. Accordingly, the vehicle control device 301 may improve the reliability of the control using the detection result of the angle sensor 53.

In addition, the vehicle control device according to the above-described embodiment of the invention is not limited to the above-described embodiment, and may be modified into various forms within the scope of claims. The vehicle control device according to the embodiment may have an appropriate combination of the components of the above-described embodiments.

The above-described ECU 7 may perform, for example, a so-called path control instead of the VSC control as the vehicle control performed based on the detection result of the angle sensor 53. For example, in the path control, a target path is generated based on the detection result obtained by a forward detection device such as a camera mounted on the vehicle 2, and the front wheel steering device 11 and the rear wheel steering device 12 of the steering device 6 are controlled based on the target path. That is, in this case, the front wheel steering device 11 and the rear wheel steering device 12 of the steering device 6 become the actuators in the vehicle control. The ECU 7 generates a target path as a target travel path for the vehicle 2 based on the existence of the peripheral object existing at the front side of the vehicle 2 in the traveling direction and detected by the forward detection, the relative physical amount between the peripheral object and the vehicle 2, the shape of the travel road for the vehicle 2, and the lane. For example, the ECU 7 generates the target path for the vehicle 2 in response to the travel path (the lane keeping assist) used for the vehicle 2 as the own vehicle to travel within the current lane, the travel path used for the vehicle 2 to escape an obstacle in front of the vehicle in the travel direction, and the travel path used for the vehicle 2 to follow the precedent traveling vehicle. Then, the ECU 7 controls the front wheel steering device 11 and the rear wheel steering device 12 so that the vehicle 2 travels according to the travel direction and the posture set in response to the generated target path. In this case, the ECU 7 calculates the target yaw rate and the target vehicle body slip angle based on the index (for example, the turning radius set in response to the target path, the distance to the obstacle, the lateral target movement distance, and the like) involved with the generated target path in addition to, for example, the vehicle speed and the steering angle detected by the steering angle sensor 54. Then, the ECU 7 controls the front wheel steering device 11 and the rear wheel steering device 12 based on the detection result of the steering angle sensor 54, the VGRS angle sensor 55, and the rear wheel steering angle sensor 56, the rear wheel steering angle control amount, and the front wheel steering angle based on the target yaw rate and the target vehicle body slip angle. As a result, the vehicle 2 may travel along the target path while the front wheel 3F and the rear wheel 3R are steered in response to the vehicle body slip angle by the front wheel steering device 11 and the rear wheel steering device 12.

Even in such a case, when the angle sensor 53 has failed, the ECU 7 limits the path control when the estimation angle error obtained based on the failure time of the angle sensor 53 and the rotation speed of the steering system is a predetermined reference value or more, and does not limit the path control when the estimation angle error is smaller than the reference value. Accordingly, the path control may be appropriately performed. In addition, the path control has a tendency that the usage zone is relatively small in a highway or the like and the steering speed becomes lower as the vehicle speed becomes higher. Based on this fact, the ECU 7 may change the rotation speed of the steering system such as the assumed maximum rotation speed (ACT–MaxSpeed) used to calculate the estimation angle error in response to the vehicle speed or the like of the vehicle 2.

Further, the ECU 7 may change the rotation speed of the steering system such as the assumed maximum rotation speed (ACT–MaxSpeed) used to calculate the estimation angle error in response to the information such as an image detected by the forward detection device, a change in parameter involved with the motion of the vehicle 2, and the steering pattern used so far. Accordingly, the vehicle control devices 1, 201, and 301 may further improve the calculation precision for the estimation angle error, and hence to continue the vehicle control with high precision.

In addition, the vehicle control devices 1, 201, and 301 may simultaneously perform a control of continuing the vehicle control using various information (the back-up angle information such as the information obtained from a sub-sensor separated from the angle sensor 53, the angle information of the EPS, and the vehicle wheel speed difference information) assisting the detection result of the angle sensor 53 in addition to the above-described continuation control in the event of the sensor failure. However, compared to such a case, the control of the ECU 7 of the embodiment is more desirable in that the vehicle control may be appropriately continued by a simple calculation within the range of the existing system.

REFERENCE SIGNS LIST

1, 201, 301 VEHICLE CONTROL DEVICE
2 VEHICLE
3 VEHICLE WHEEL
4 DRIVING DEVICE
5 BRAKING DEVICE
6 STEERING DEVICE
7 ECU (CONTROL DEVICE)
8 VSC ACTUATOR (ACTUATOR)
9 WHEEL CYLINDER
10 BRAKING UNIT
11 FRONT WHEEL STEERING DEVICE
12 REAR WHEEL STEERING DEVICE
13 STEERING WHEEL
14 VGRS DEVICE
15 STEERING ANGLE GIVING MECHANISM
16 EPS DEVICE
19 VGRS MOTOR (ROTARY MACHINE)
22 EPS MOTOR
23 ARS DEVICE
24 ARS MOTOR (ROTARY MACHINE)
25 STEERING FORCE TRANSMISSION MECHANISM
26, 27 STOP MECHANISM
50 VEHICLE WHEEL SPEED SENSOR
51 YAW RATE SENSOR
52 LATERAL G SENSOR
53 ANGLE SENSOR
54 STEERING ANGLE SENSOR
55 VGRS ANGLE SENSOR
56 REAR WHEEL STEERING ANGLE SENSOR

The invention claimed is:

1. A vehicle control device comprising:
an angle sensor configured to detect a rotation angle of a steering system of a vehicle;
an actuator mounted on the vehicle; and
a control device configured to perform a vehicle control by controlling the actuator based on the detection result of the angle sensor,
wherein the control device is configured to:
determine, based on a sensor signal of the angle sensor, whether the angle sensor has a failure;
based upon the an sensor being determined to have the failure, calculate an estimation angle error based on a failure time of the angle sensor and a rotation speed of the steering system; and
limit the vehicle control when the estimation angle error is not smaller than a predetermined reference value and not limit the vehicle control when the estimation angle error is smaller than the predetermined reference value.

2. The vehicle control device according to claim 1, wherein the rotation speed of the steering system is set in response to a predetermined assumed maximum rotation speed.

3. The vehicle control device according to claim 1, wherein the control device is configured to perform other control different from the vehicle control based on the detection result of the angle sensor, limit the other control at the time the angle sensor has failed, and not to limit the vehicle control at a time the estimation angle error is smaller than the reference value.

4. The vehicle control device according to claim 1,
wherein the estimation angle error relatively becomes larger as the failure time of the angle sensor relatively becomes longer, and relatively becomes larger as the rotation speed of the steering system relatively becomes faster.

5. The vehicle control device according to claim 1, further comprising:
a stop mechanism configured to regulate a change in the rotation angle of the steering system,
wherein the control device is configured to calculate the estimation angle error based on the failure time of the angle sensor and the rotation speed of the steering system, and suppress an increase in the calculated estimation angle error while the stop mechanism regulates a change in the rotation angle of the steering system after the angle sensor has failed.

6. The vehicle control device according to claim 1, further comprising:
a rotary machine configured to brake a rotation of a part of which the rotation angle is detected by the angle sensor at the time the angle sensor has failed.

7. The vehicle control device according to claim 6, wherein the control device is configured to calculate the estimation angle error based on a counter-electromotive force generated in the rotary machine at a time the rotation of the part of which the rotation angle is detected by the angle sensor is braked.

8. The vehicle control device according to claim 6, wherein the control device is configured to correct the output value of the angle sensor based on the counter-electromotive force generated in the rotary machine at a time the rotation of the part of which the rotation angle is detected by the angle sensor is braked.

9. The vehicle control device according to claim 8, wherein the control device is configured to determine whether to correct the output value of the angle sensor based on a parameter involved with a motion actually generated in the vehicle and a parameter involved with a motion of the vehicle estimated based on the corrected output value of the angle sensor.

10. The vehicle control device according to claim 1, wherein the angle sensor includes at least one of:
a steering angle sensor configured to detect a rotation angle of a steering member of the vehicle as the rotation angle of the steering system;
a VGRS angle sensor configured to detect a VGRS angle of a VGRS device changing a steering angle of a steering wheel with respect to the steering angle of the steering member as the rotation angle of the steering system; and
a rear wheel steering angle sensor configured to detect a rear wheel steering angle of a rear wheel steering device capable of steering the rear wheel of the vehicle as the rotation angle of the steering system.

11. The vehicle control device according to claim 1, wherein the vehicle control is a VSC control of controlling the turning state of the vehicle.

12. The vehicle control device according to claim 1, wherein the control device is configured to limit the vehicle control by prohibiting the vehicle control or limiting a target control amount of the vehicle control to a relatively small value compared to the case where the vehicle control is not limited.

* * * * *